US009168968B2

(12) United States Patent
Pomerantz et al.

(10) Patent No.: US 9,168,968 B2
(45) Date of Patent: Oct. 27, 2015

(54) ANTI-ROTATION SURROGATE BICYCLE TOP TUBE

(75) Inventors: Mitchell P. Pomerantz, Highland Park, IL (US); James T. Stevens, Cheshire, CT (US); Joseph R. Flaherty, Prospect, CT (US)

(73) Assignee: THULE SWEDEN AB, Hillerstorp (SE)

(*) Notice: Subject to any disclaimer, the term of this patent is extended or adjusted under 35 U.S.C. 154(b) by 0 days.

(21) Appl. No.: 13/811,786

(22) PCT Filed: Jul. 29, 2011

(86) PCT No.: PCT/US2011/045916
§ 371 (c)(1),
(2), (4) Date: Jun. 6, 2013

(87) PCT Pub. No.: WO2012/016156
PCT Pub. Date: Feb. 2, 2012

(65) Prior Publication Data

US 2013/0270793 A1 Oct. 17, 2013

Related U.S. Application Data

(60) Provisional application No. 61/369,582, filed on Jul. 30, 2010.

(51) Int. Cl.
*B62K 3/04* (2006.01)
*B62K 13/00* (2006.01)
(Continued)

(52) U.S. Cl.
CPC . *B62K 19/30* (2013.01); *B60R 9/10* (2013.01); *B62J 99/00* (2013.01); *B62K 19/24* (2013.01);
(Continued)

(58) Field of Classification Search
CPC ........... B62K 3/02; B62K 3/04; B62K 13/00; B62K 13/08; B62K 19/00; B62K 19/02; B62K 19/06; B62K 2015/001; B62K 2700/04
USPC ........... 280/7.11, 274, 278, 287, 281.1, 288.4
See application file for complete search history.

(56) References Cited

U.S. PATENT DOCUMENTS 443,482 A * 12/1890 Hunt ............................ 280/260
529,861 A * 11/1894 Hersh .......................... 280/7.11
4,647,060 A * 3/1987 Tomkinson ................ 280/288.1
5,149,112 A * 9/1992 Nauman et al. .............. 280/7.11
5,558,349 A 9/1996 Rubin
(Continued)

FOREIGN PATENT DOCUMENTS

EP 1440876 A1 7/2004
WO 2009018604 A1 2/2009
WO 2012016156 A1 2/2012

OTHER PUBLICATIONS

International Searching Authority, International Search Report for International Application No. PCT/US2011/045916, dated Nov. 2, 2011.

*Primary Examiner* — Anne Marie Boehler
(74) *Attorney, Agent, or Firm* — Novak Druce Connolly Bove + Quigg LLP

(57) ABSTRACT

A detachable top tube assembly includes inner and outer tube members telescopically received by one another. Each inner and outer tube member includes one or more of an elliptical cross-sectional shape or is arced along a longitudinal axis thereof to prevent rotation of the inner and outer tube members relative to one another. Each of a pair of yoke assemblies is disposed at opposite ends of the inner and outer tube members and include a rotatable gate assembly for opening and closing the yoke assemblies. A pair of spring biased members is provided for engagement with the rotatable gate assemblies to maintain the gate assemblies in a closed position. A pair of button covers is provided for depressably engaging each spring biased member so to allow the gate assemblies to be rotated relative to a respective inner and outer tube member.

20 Claims, 15 Drawing Sheets

(51) Int. Cl.

| | |
|---|---|
| ***B62K 19/30*** | (2006.01) |
| ***B60R 9/10*** | (2006.01) |
| ***B62J 99/00*** | (2009.01) |
| ***B62K 19/24*** | (2006.01) |

(52) U.S. Cl.
CPC ... *B62J 2099/0053* (2013.01); *B62J 2099/0073* (2013.01); *B62K 3/04* (2013.01); *B62K 13/00* (2013.01)

(56) References Cited

U.S. PATENT DOCUMENTS

| | | | | |
|---|---|---|---|---|
| 6,340,509 | B1 * | 1/2002 | Nelson et al. ................ | 428/34.7 |
| 6,361,002 | B1 | 3/2002 | Cheng | |
| 6,471,232 | B2 * | 10/2002 | Huang ....................... | 280/304.5 |
| 6,503,019 | B1 * | 1/2003 | Wang ......................... | 403/109.1 |
| 2003/0213330 | A1 | 11/2003 | Wang | |
| 2011/0115192 | A1 * | 5/2011 | Helms et al. ............... | 280/281.1 |

* cited by examiner

ANTI-ROTATION SURROGATE BICYCLE TOP TUBE

CROSS-REFERENCE TO RELATED APPLICATIONS

This application claims the benefit of U.S. Provisional Application No. 61/369,582, filed Jul. 30, 2010 and entitled Detachable Top Tube Assembly for a Bicycle, the disclosure of which is hereby expressly incorporated herein by reference in its entirety. This application is a national stage application of international application no. PCT/US 11/45916, which has an international filing date of Jul. 29, 2011, and which is entirely incorporated by reference herein.

FIELD OF TECHNOLOGY

The instant disclosure relates to a detachable top tube assembly for a bicycle lacking a top tube, and more specifically, to a detachable surrogate top tube assembly for securing a bicycle to a vehicle mounted carrier.

BACKGROUND OF THE INVENTION

Bicycles are typically transported on load carriers mounted to a carrying vehicle. In many cases, vehicle mounted carriers, particularly those types of vehicle mounted carriers that secure to the rear of a vehicle include a securing assembly for securing the top tube of a bicycle to the vehicle carrier. However, bicycles such as women's style bicycles and bicycles including suspension systems typically do not include such a top tube that can be used to secure the bike to the carrier. Accordingly, it can be difficult to secure such bike types to a vehicle mounted carrier and/or the bicycle may be improperly installed.

In order to address the above deficiencies, some manufactures have developed detachable or surrogate top tube assemblies that can be attached to a bicycle to provide a top tube with which to secure the bicycle to the vehicle mounted carrier. Such detachable and surrogate assemblies typically include yoke structures that are disposed at the ends of a telescoping tube assembly. The yokes typically secure to a seat tube and handlebar stem assembly of a bicycle. However, because most detachable and surrogate top tube assemblies are fabricated from round telescoping tubes having circular cross-sections, the telescoping members of the top tubes have a tendency to rotate relative to one another. This can cause a user to improperly orient the yoke structures when the detachable or surrogate top tube assembly is secured to the bicycle. As a result, the detachable or surrogate top tube assemblies can be improperly installed. Consequently, the detachable or surrogate top tube assembly may not sufficiently or properly support the bicycle upon the vehicle mounted carrier and cause the bicycle to become unsecured during transport. Additionally, whereas manufacturers have fabricated telescoping tube assemblies from tubing having a circular cross-sectional shape, such assemblies typically require additional structures to arrest such rotation and/or require additional manufacturing steps that.

BRIEF DESCRIPTION OF THE DRAWINGS

Implementations of the present application will now be described, by way of example only, with reference to the attached Figures, wherein.

DETAILED DESCRIPTION

Figure 1:
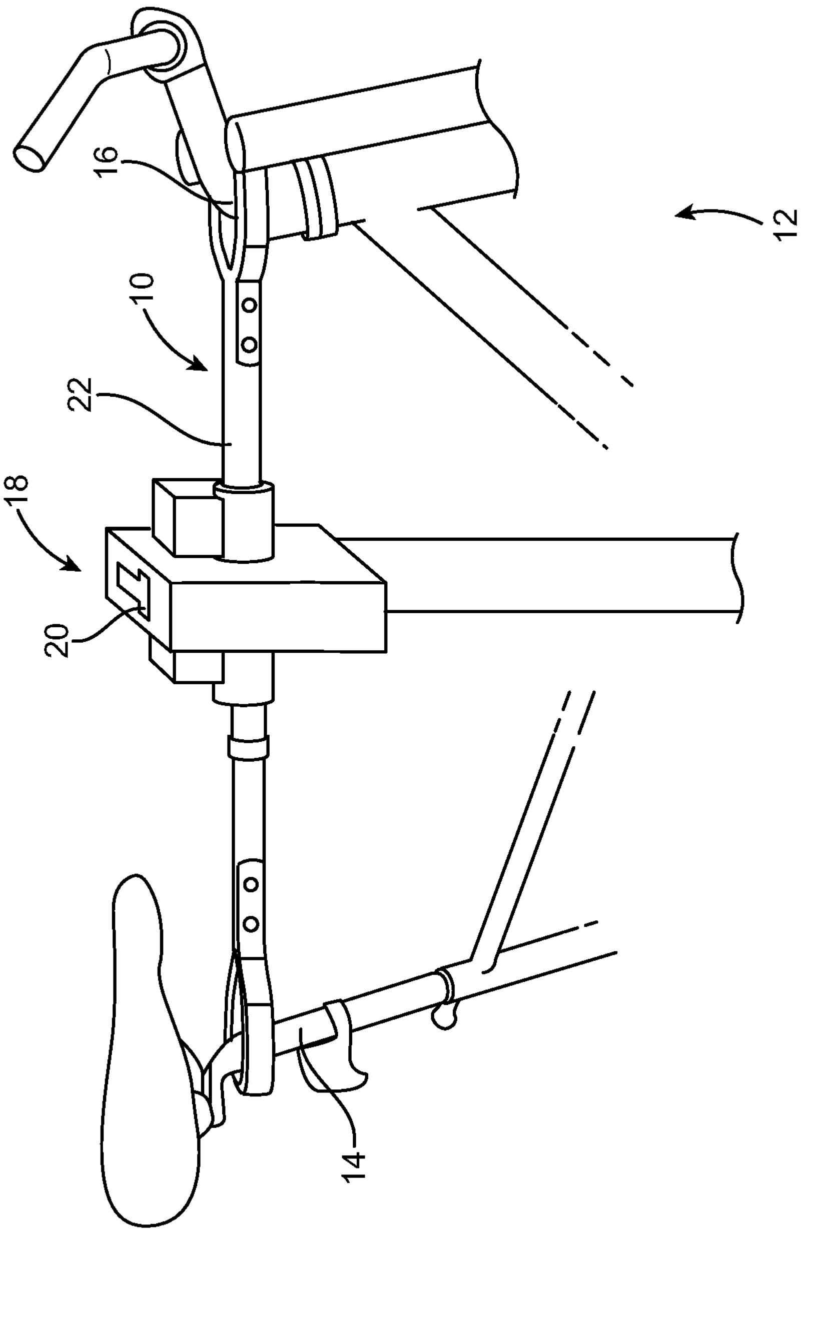
FIG. 1 is a perspective view of a detachable top tube assembly for a bicycle secured to a bicycle and in association with a vehicle carrier in accordance with an exemplary implementation.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Referring to FIG. 1, a detachable surrogate top tube assembly 10 according to an exemplary implementation is shown secured to bicycle 12 at seat post 14 and handlebar stem assembly 16. The combination of the bicycle 12 and detachable top tube assembly 10 are secured to vehicle mounted carrier 18 at receiving assembly 20, which receives a telescoping tube portion 22 of the detachable top tube assembly therein.

Figure 2A:
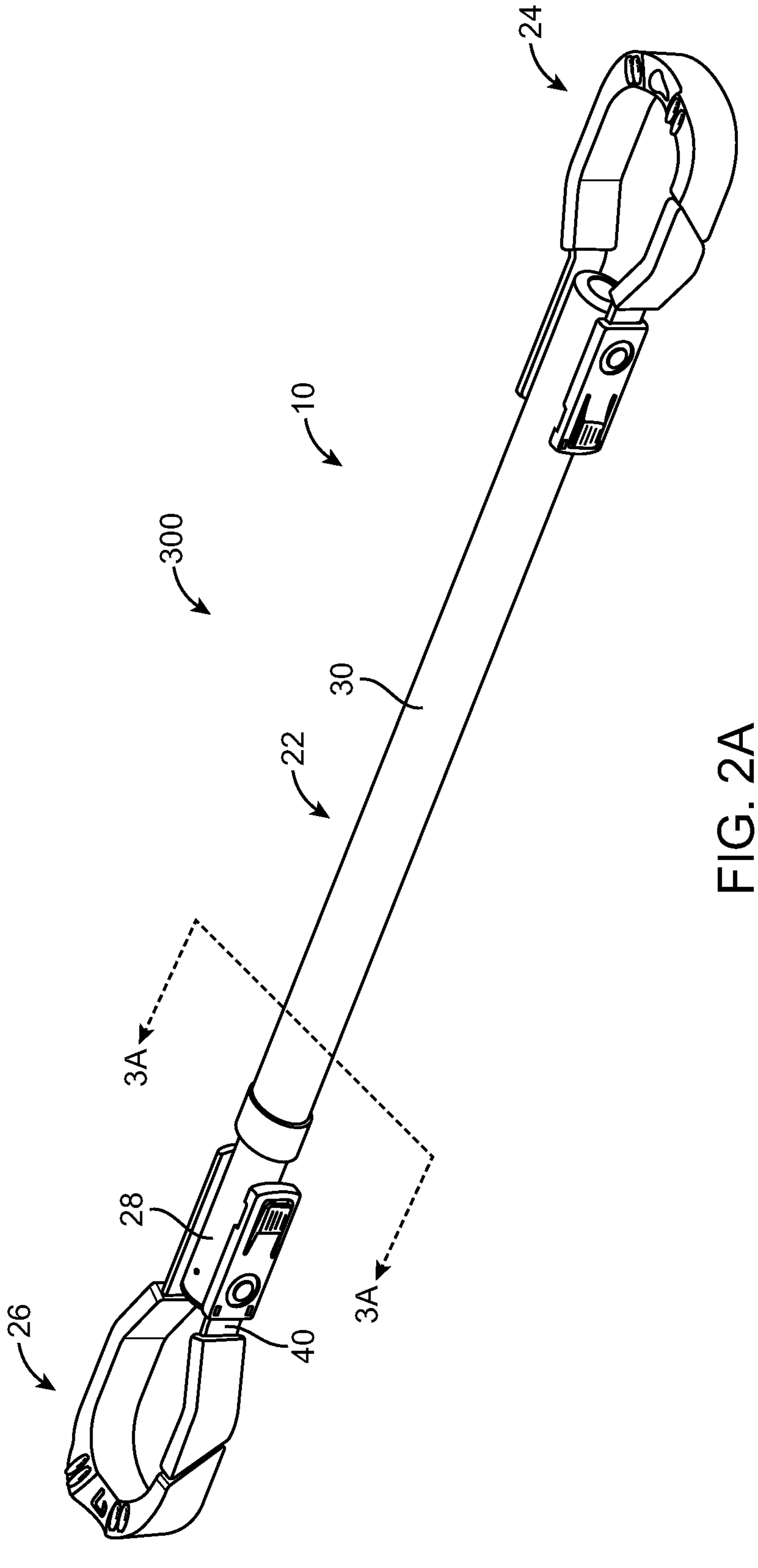
FIGS. 2A and 2B are perspective views of a detachable top tube assembly for a bicycle in retracted and extended configurations, respectively, in accordance with an exemplary implementation.
Figure 2B:
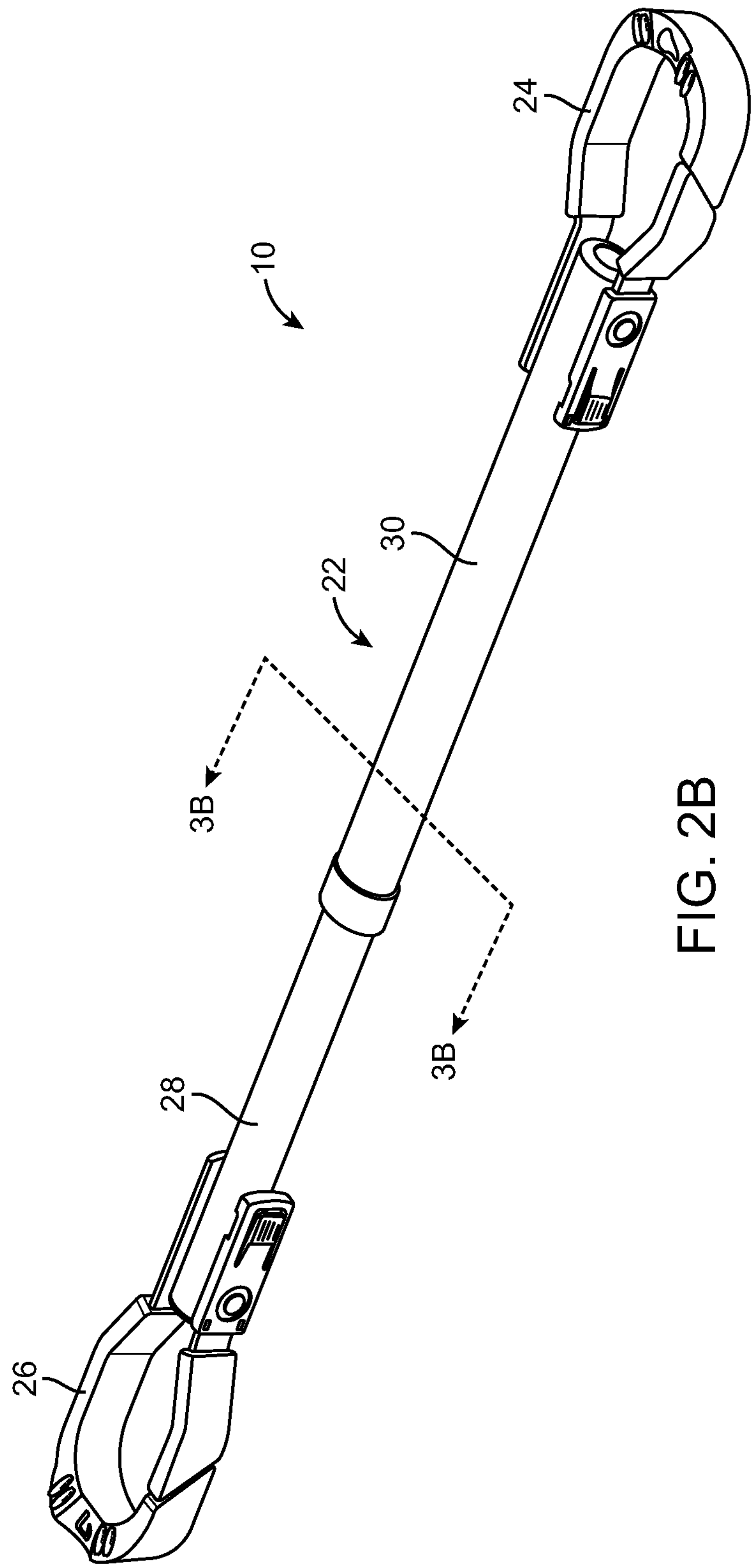
Figure 3B:
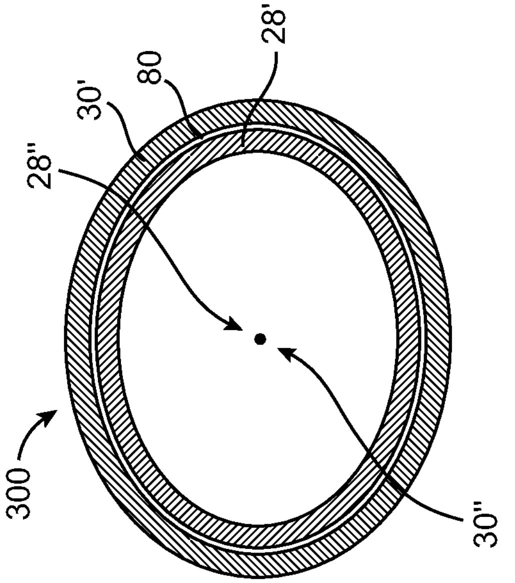
FIG. 3B is a cross-sectional view, taken generally along line 3B-3B of FIG. 2B, of a detachable top tube assembly for a bicycle in accordance with an exemplary implementation.
Figure 3A:
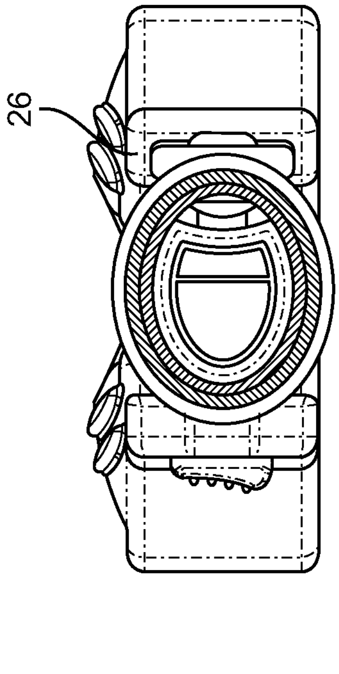
FIG. 3A is a cutaway, partial cross-sectional view, taken generally along line 3A-3A of FIG. 2A, of a detachable top tube assembly for a bicycle in accordance with an exemplary implementation.
Figure 4:
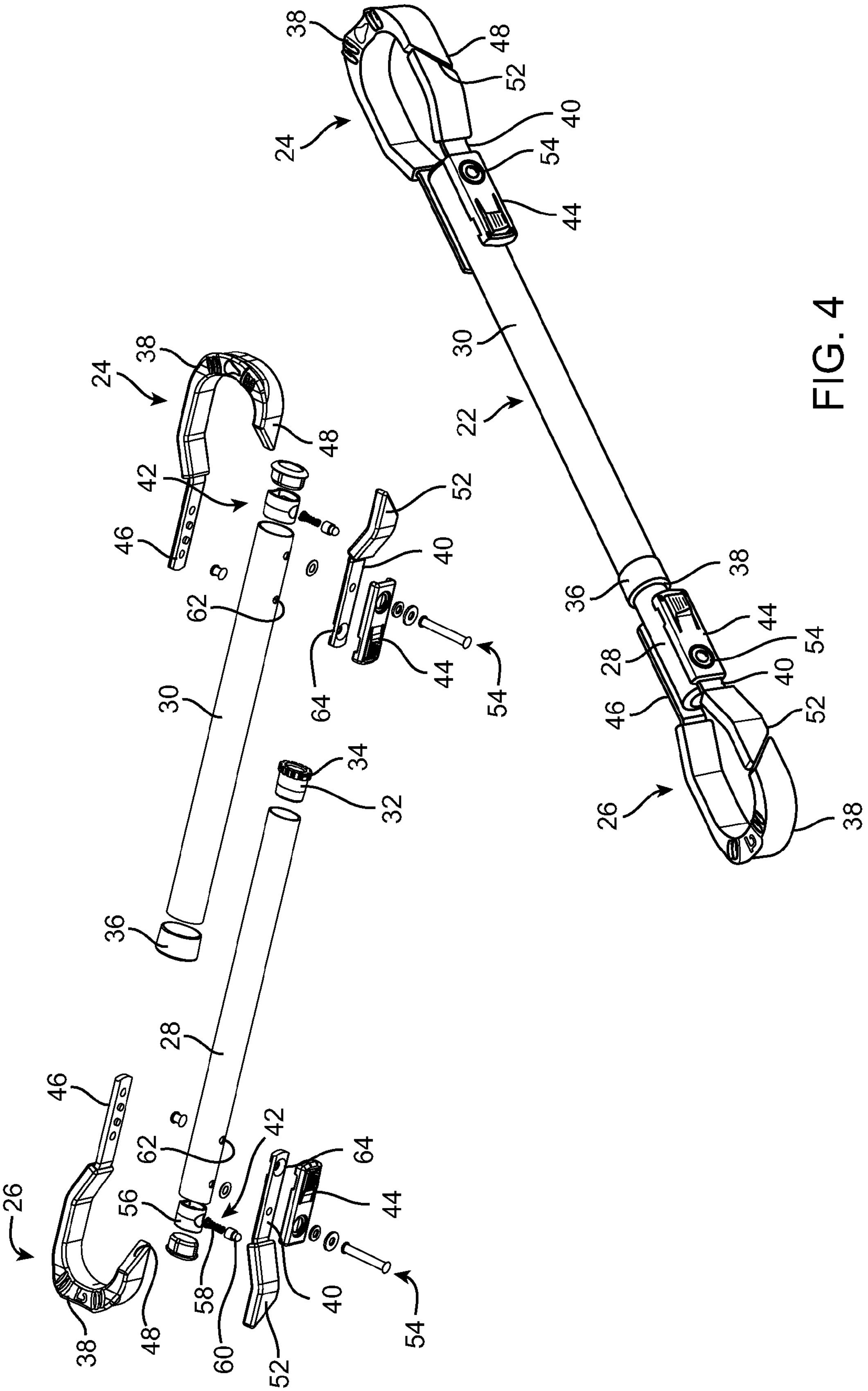
FIG. 4 is an exploded view of a detachable top tube assembly for a bicycle in accordance with an exemplary implementation.

Referring to FIGS. 2-4, detachable top tube assembly 10 according to an exemplary implementation includes releasable bicycle frame securement devices in the form of yoke assemblies 24, 26 secured and disposed at terminal ends of telescoping tube portion 22. The yoke assemblies 24, 26 are described in more detail relative to FIGS. 5-6 and are configured to receive vertical portions of the seat post 14 and handlebar stem assembly 16 therein as shown in FIG. 1.

Telescoping tube 22 includes an inner tube member 28 and an outer tube member 30 that respectively include an insert portion 28' and a receiving portion 30' that are slidably and telescopically received, one within the other, thereby allowing the length of the telescoping tube 22 to be adjusted to accommodate a number of bicycle types. As shown in FIGS. 3A and 3B, each of the inner tube member 28 and an outer tube member 30 are formed from non-round shaped tubing exemplarily having an elliptical cross-sectional shape, which owing to the major and minor axes of the elliptical cross-sectional shape, sufficiently interfere with one another to prevent the inner tube member 28, at the insert portion 28', and outer tube member 30, at the receiving portion 30', from rotating relative to one another. As a result, rotation of yoke assemblies 24, 26, relative to one another is arrested. By limiting the yoke assemblies 24, 26 against rotating relative to one another, a user is less likely to improperly install the detachable top tube assembly 10 upon a bicycle.

While an elliptical cross-sectional shape is described, it should be appreciated that tubular members that have continuous lengthwise arcuate cross-sectional shapes are also contemplated for affecting the desired rotation-blocking interference.

As may be appreciated from the figures generally, an anti-rotation, detachable surrogate top tube assembly 10 for a bicycle is described and shown. Therein, an inner tube member 28 having an insert portion 28' that is telescopically inserted within a receiving portion 30' of an outer tube member 30 is depicted. The insert and receiving portions 28', 30' each have a lengthwise centered longitudinal axis 28", 30" that is oriented substantially coincident, one with the other, in a retracted configuration 300 (see particularly, FIGS. 2A and 3B) The insert portion 28' and the receiving portion 30' each having a non-round cross-sectional shape with a sufficiently narrow clearance space 80 therebetween that rotation of the insert portion 28' relative to the receiving portion 30' is limited by abutting interference between an exterior surface of the inner tube member 28 and an interior surface of the outer tube member 28 upon relative rotation of the members 28, 30. Exemplarily, and as most clearly shown in FIG. 3B, the insert portion 28' and the receiving portion 30' can each have an elliptical cross-sectional shape. FIG. 3B also shows the exterior surface of the insert portion 28' is complementarily shaped to the interior surface of the receiving portion 30' thereby establishing a substantial conformance fit therebetween in the retracted configuration 300.

FIG. 2A depicts the outer tube member 30 surrounding a majority (greater than fifty percent) of a length of the inner tube member 28 in the retracted configuration 300.

FIGS. 7A-7D depict an alternative embodiment in which the insert and receiving portions 28', 30' have a substantially uniform cross-sectional shape along a length thereof like in FIG. 3B, but here the longitudinal axes 28", 30" centered therein are arc-shaped. Each of the longitudinal axes 28", 30" is arc-shaped on an approximately three meter radius 202, 204. The inner tube member 28 and the outer tube member 30 are each approximately one-third of a meter long 206, 208.

Now referring back to FIG. 4, the telescoping tube portion 22 can include a plug assembly 32, which is secured to a terminal end of the inner tube member 28 opposite a yoke assembly. The plug assembly 32 is received within the outer tube member 30 and can include a serrated flange portion 34. The plug assembly 32 can be formed of plastic, rubber or other similar material. The serrated flange portion 34 has an elliptical diameter that is larger than the inner tube member 28, yet slightly smaller than that of the inner wall of the outer tube member 30. Consequently, the plug assembly 32 can provide a slight amount of friction between the inner tube member 28 and the inner wall of the outer tube member 30. As a result, the inner and outer tube members 28, 30 may not glide too easily relative to one another and/or readily separate from one another. The telescoping tube portion 22 can also include a retaining ring assembly 36, which is secured to a terminal end of the outer tube member 28 opposite a yoke assembly. Retaining ring assembly 36 can include a flange portion 38 that has an inner elliptical diameter slightly larger than the outer wall of inner tube member 28, yet smaller than the elliptical diameter of the serrated flange portion 34 of plug assembly 32. Accordingly, the retaining ring assembly 36 can engage the plug assembly 34. The retaining ring 36 can be formed of plastic, rubber or other like material. The combination of the plug assembly 34 and retaining ring 36 allow the inner and outer tube members 28, 30 to slide relative to one another while also minimizing the inadvertent separation of the inner tube portion 28 and the outer tube portion 30 from one another.

Referring now to FIGS. 4-7, as previously indicated, releasable bicycle frame securement devices in the form of yoke assemblies 24, 26 are secured and disposed at terminal ends of telescoping tube portion 22 and are provided to receive vertical portions of seat post 14 and handlebar stem assembly 16 of a bicycle 12. With the exception of symbols designating a seat and a handle bar assembly, the yoke assemblies 24 and 26 are generally structurally identical to one another. That is, each of the yoke assemblies 24, 26 includes the partial loop flange portion 38, a gate assembly 40, a biased button assembly 42 and a button cover 44. The yoke assemblies 24, 26 are fabricated from a strong, rigid material sufficient to support a bicycle thereon and can include a plastic or rubber coating thereon, for example, to prevent damage to a bicycle, e.g., dents and scratches.

The partial loops 38 terminate at one end in upwardly directed angled ends 48 so as to form openings 50. The opposite end of the partial loops 38 terminate in securing portions 46, which secure the partial loops 38 to the inner and outer tube portions 28', 30'. The partial loops 38 can be fixed to the inner and outer tube portions 28', 30' using a plurality of fasteners, such as rivets, to prevent rotational or other movement thereof. The upwardly directed angled ends 48 terminate to form openings 50, which allow the yoke assemblies 24, 26 to be secured about and engage with one of the seat post 14 or handlebar stem assembly 16 of a bicycle 12. The upwardly directed angled ends 48 substantially register with downwardly directed angled ends 52 of gate assemblies 40 such that when the gate assemblies 40 are rotated such that the downwardly directed angled ends 52 thereof abut the upwardly directed angled ends 48 of the partial loops 38, openings 50 may be closed and further downwardly directed rotation of the gate assemblies 40 prevented—this can be important, for example, to prevent the yoke assemblies from opening should the weight of the bicycle shift from the partial loops 38 to the gate assemblies 40 during transport. Additionally, it should be noted that openings 50 can be disposed on same sides of the telescoping tube portion 22; e.g., a opening toward a user to allow a user to more easily attach/remove the detachable top tube assembly 10 to a bicycle and/or simply allow a user to easily remove the bicycle 12 from the detachable top tube assembly 10 when it is secured to a vehicle carrier.

Figure 5A:
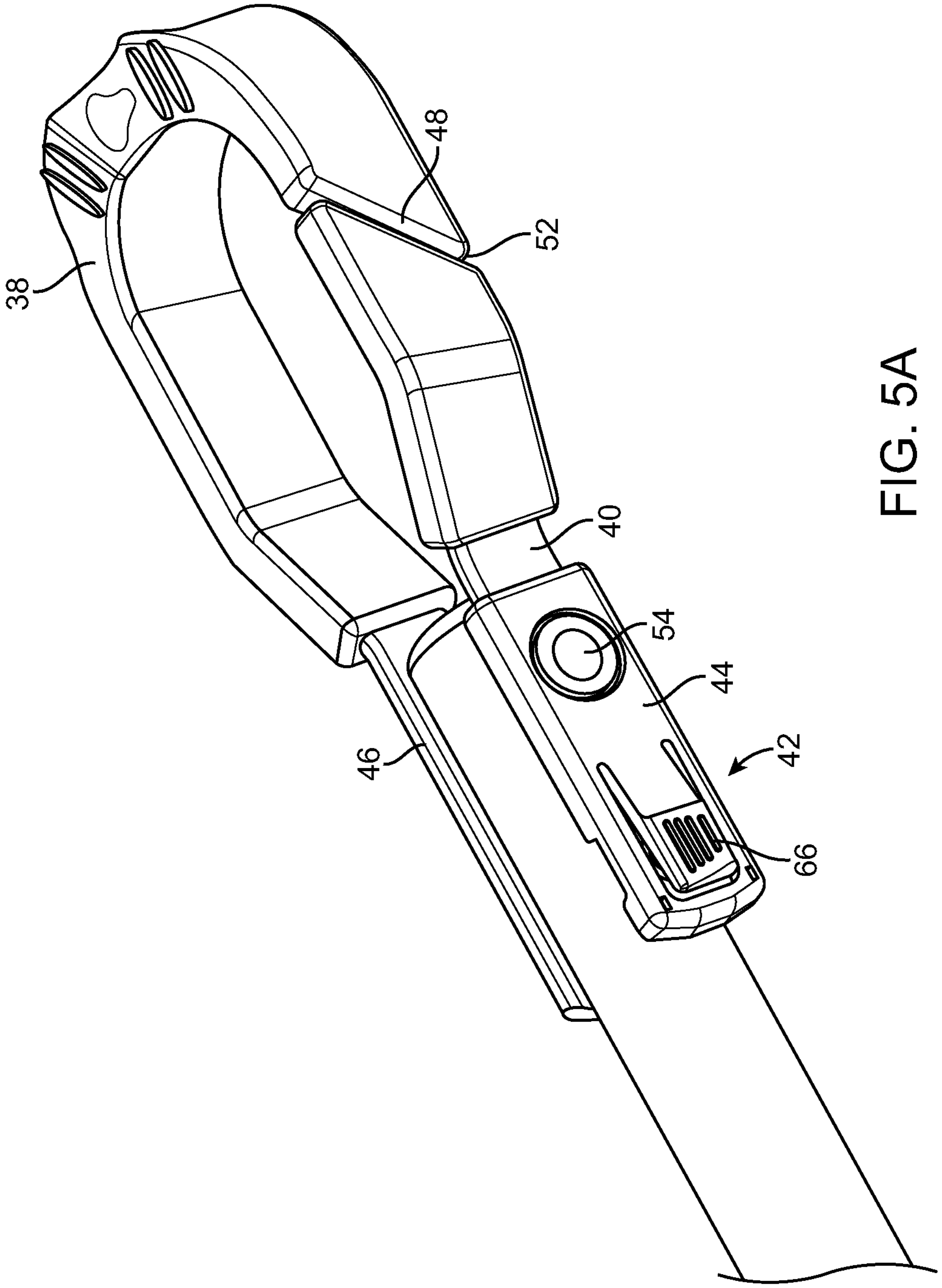
FIGS. 5A and 5B are perspective views of end portions of a detachable top tube assembly for a bicycle in accordance with an exemplary implementation showing a yoke in a closed and an open position, respectively.
Figure 5B:
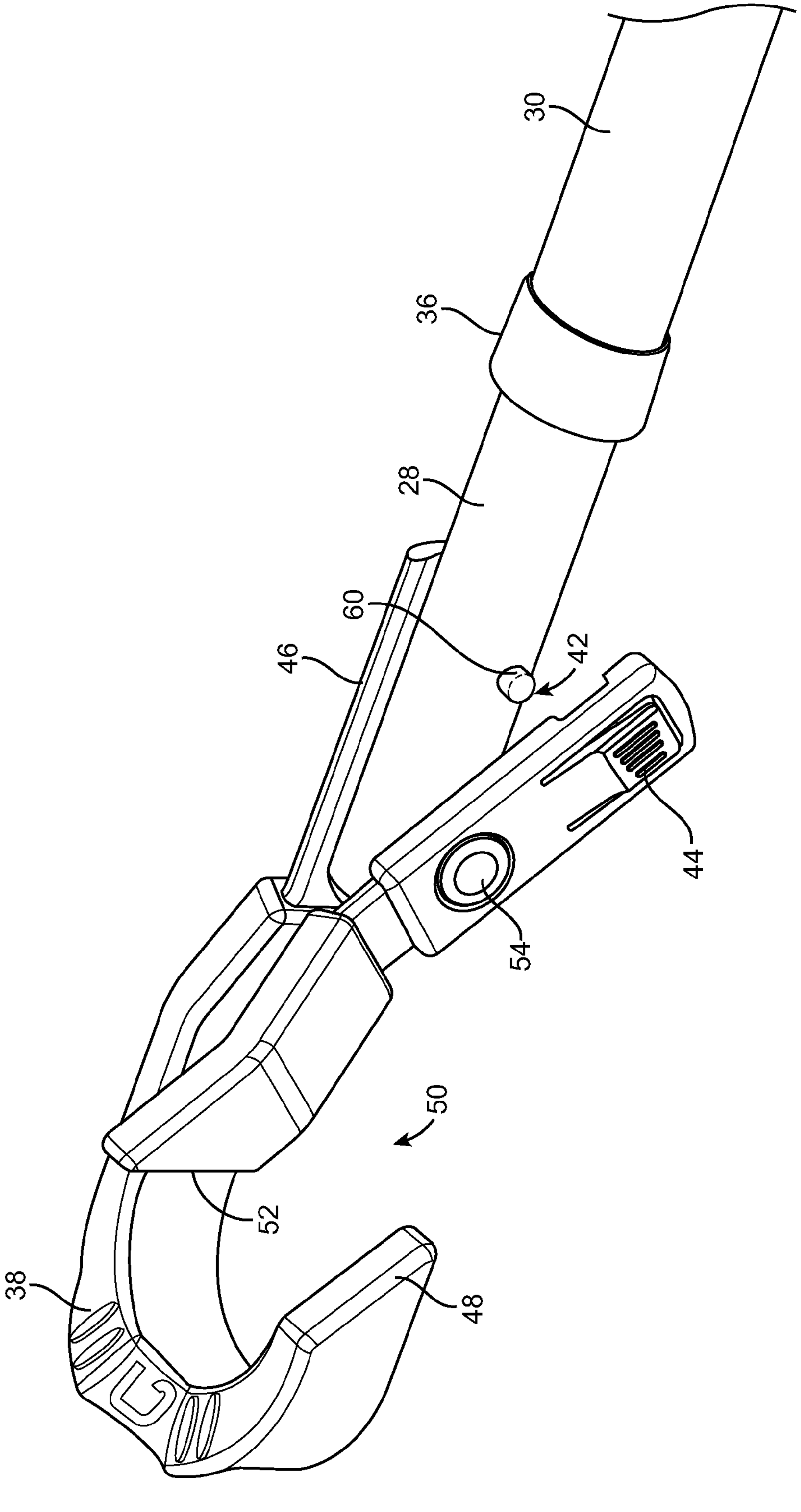
Figure 5C:
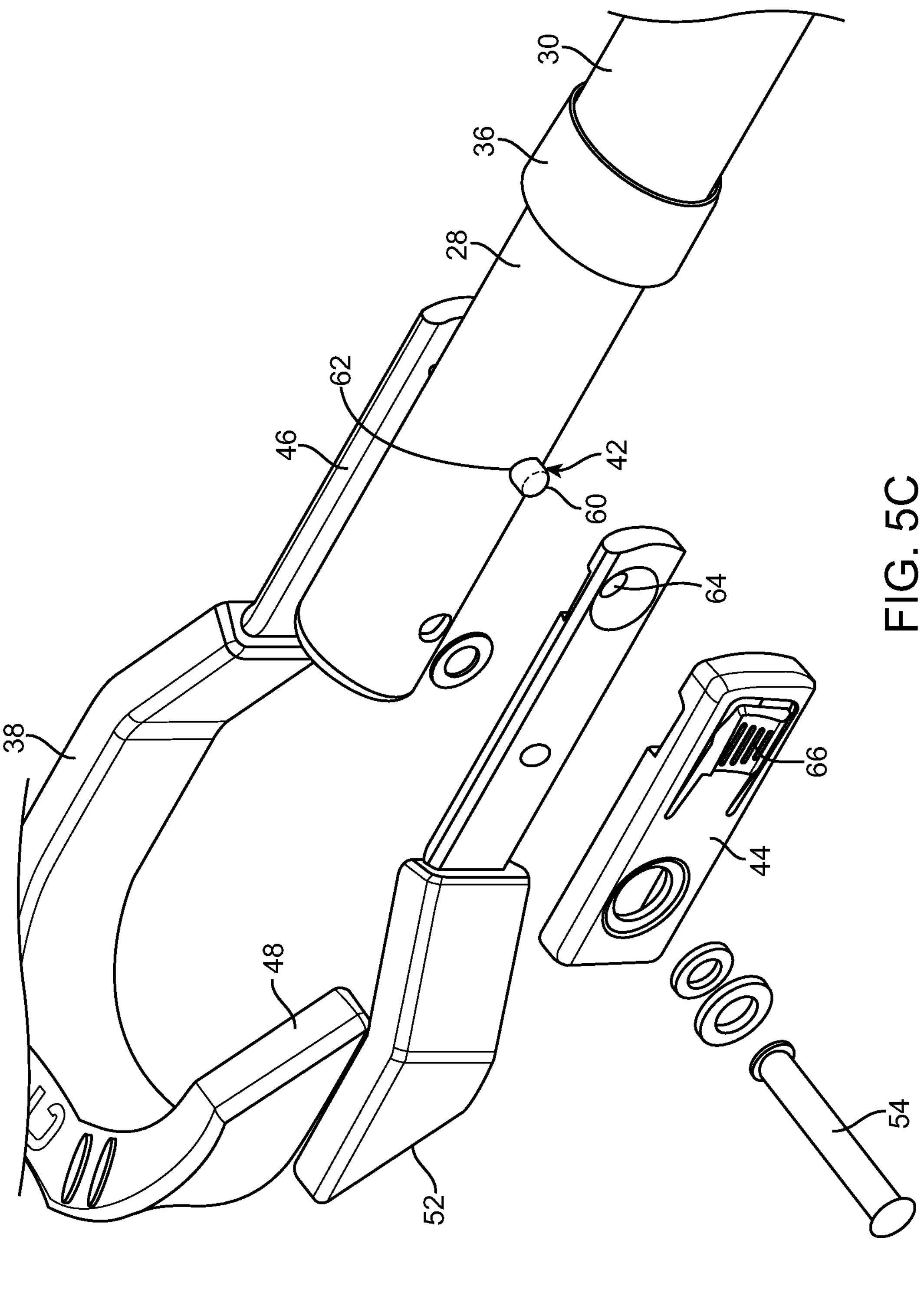
FIGS. 5C and 5D are exploded perspective views of end portions of a detachable top tube assembly for a bicycle in accordance with an exemplary implementation.
Figure 5D:
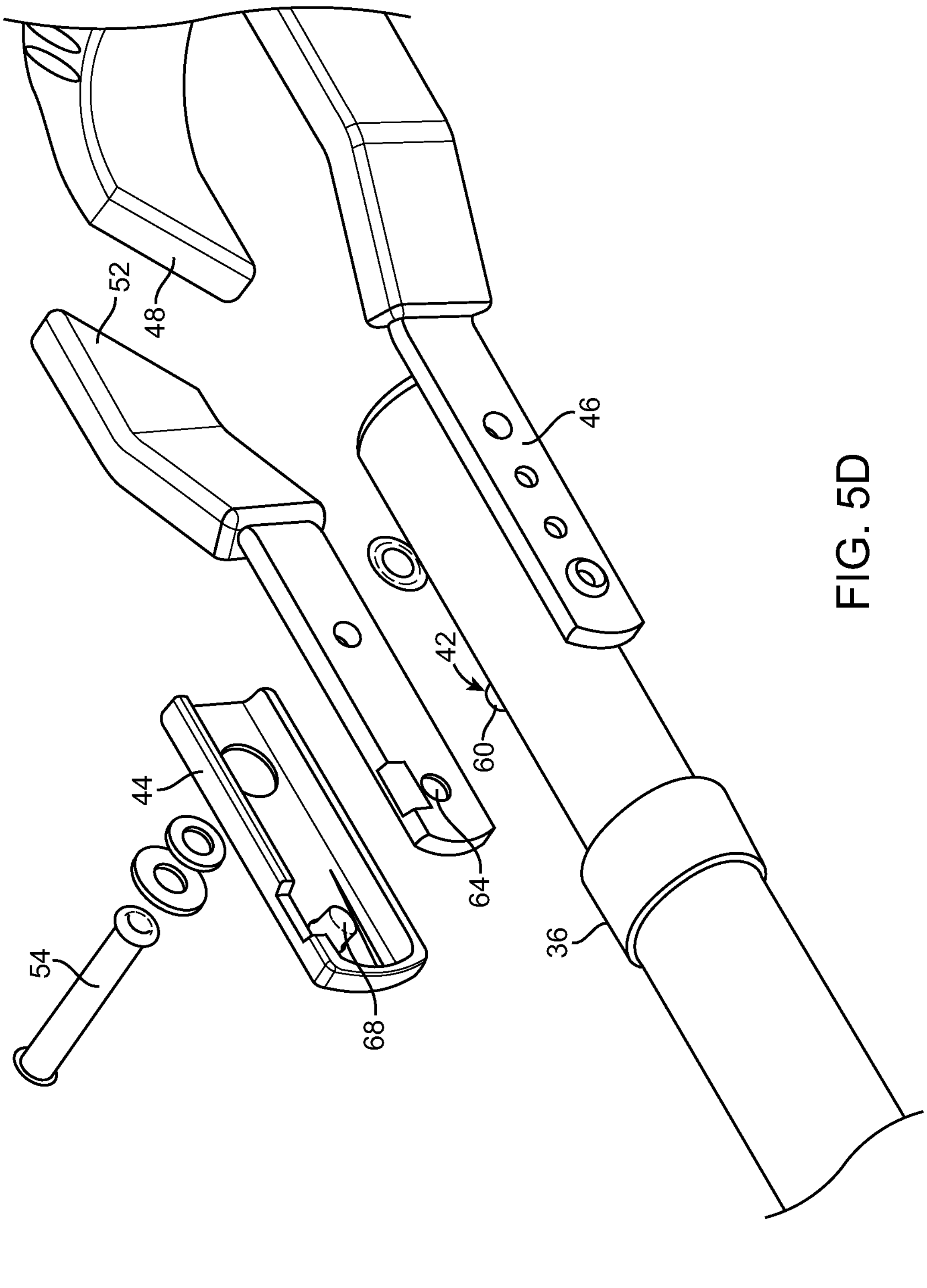
Figure 5F:
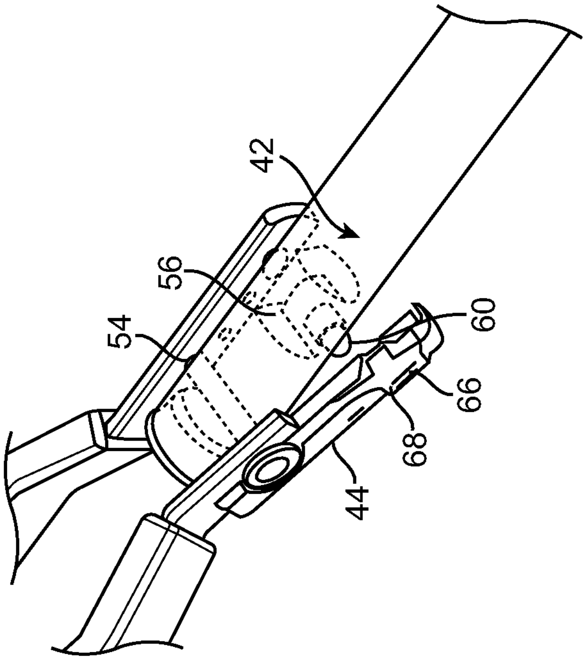
FIGS. 5E and 5F are perspective see-through views of end portions of a detachable top tube assembly for a bicycle in accordance with an exemplary implementation.
Figure 5E:
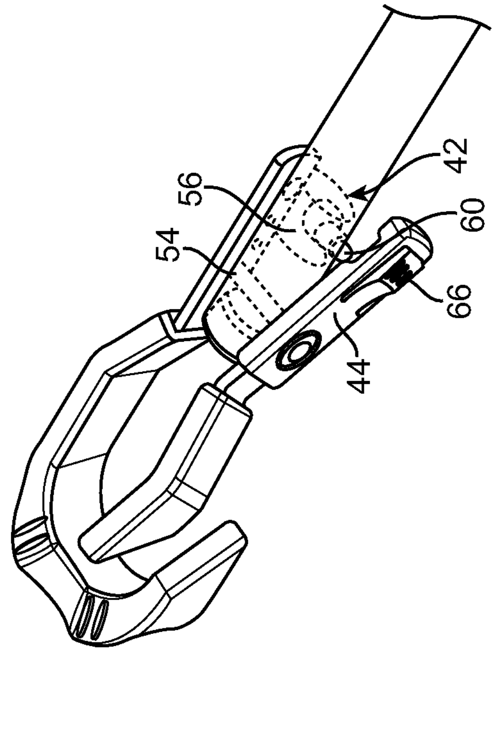
Figure 6A:
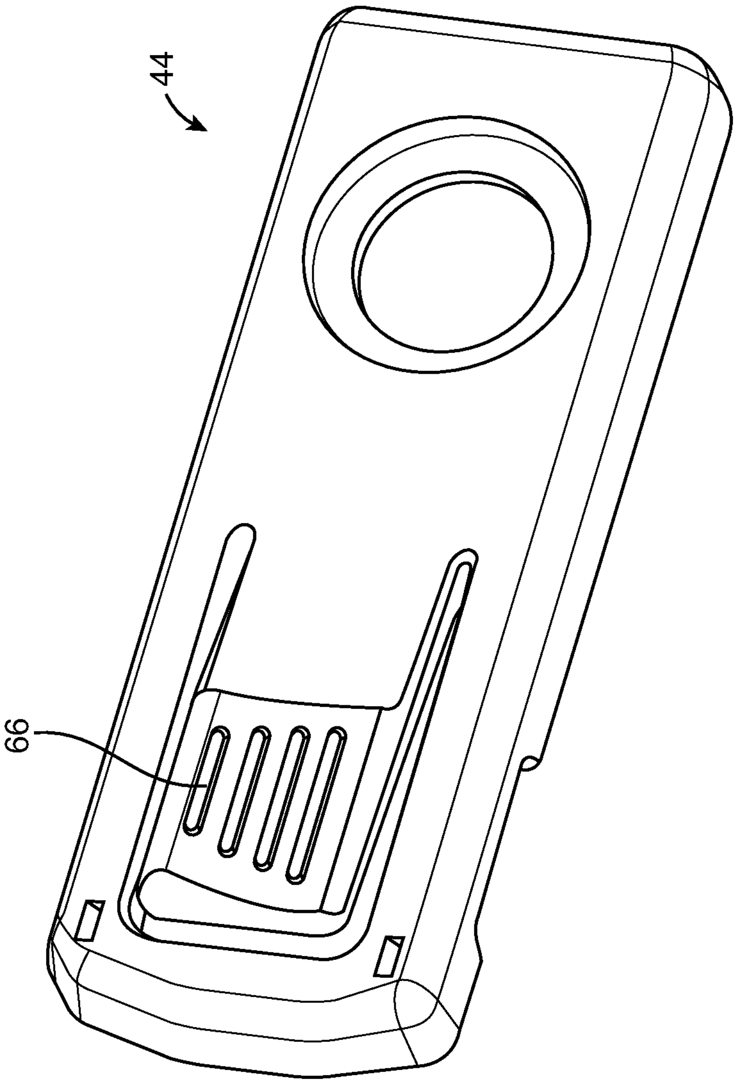
FIGS. 6A, 6B and 6C are front, rear and cutaway perspective views, respectively, of a button cover assembly in accordance with an exemplary implementation.
Figure 6B:
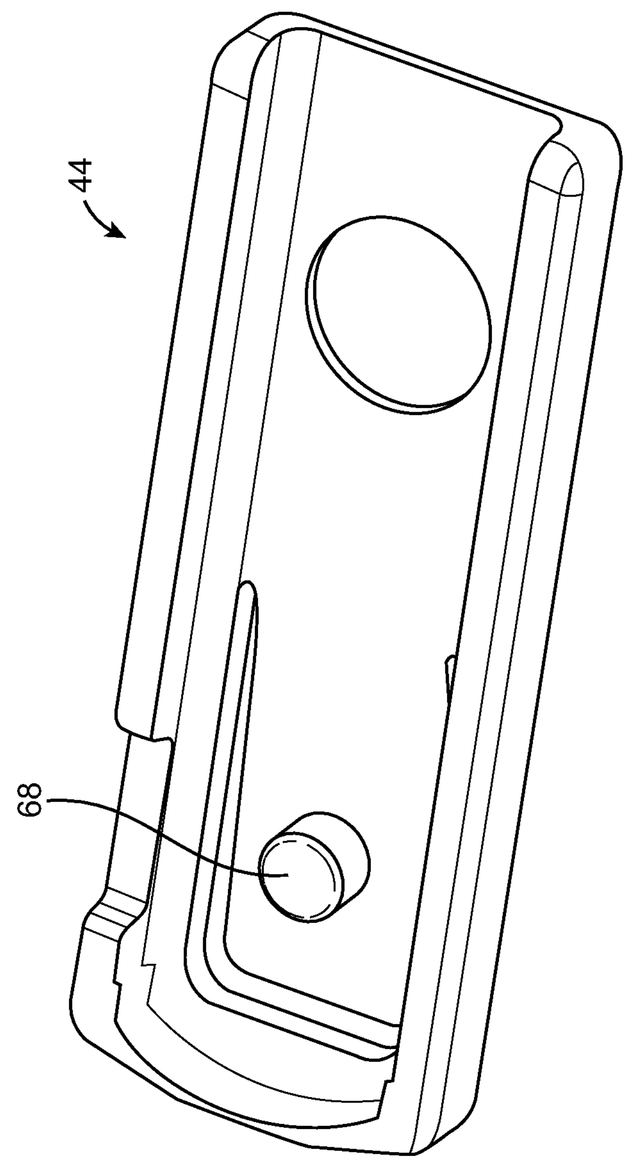
Figure 6C:
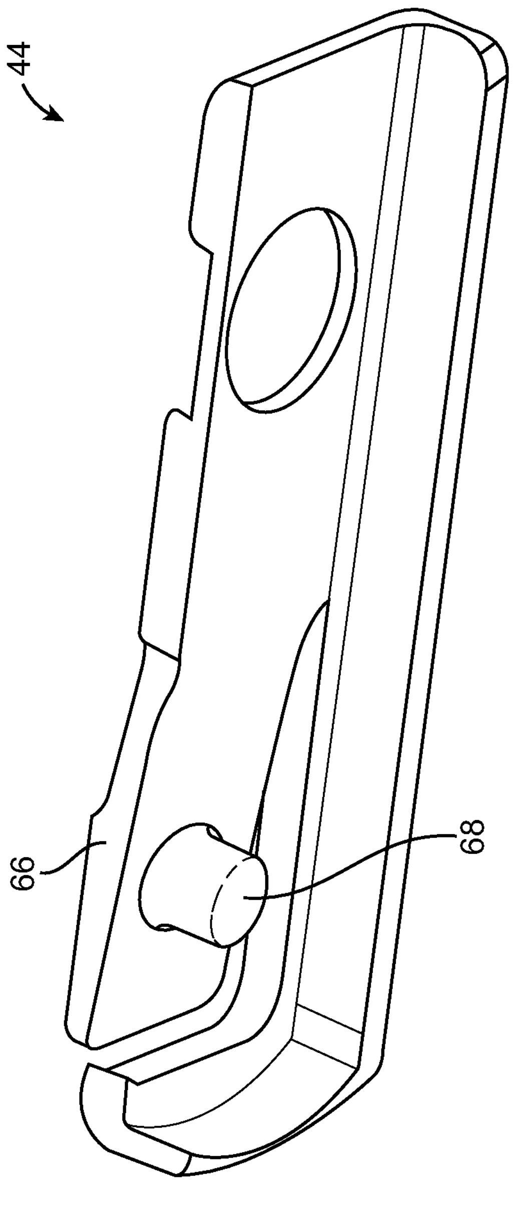
Figures 7A, 7B, 7C:
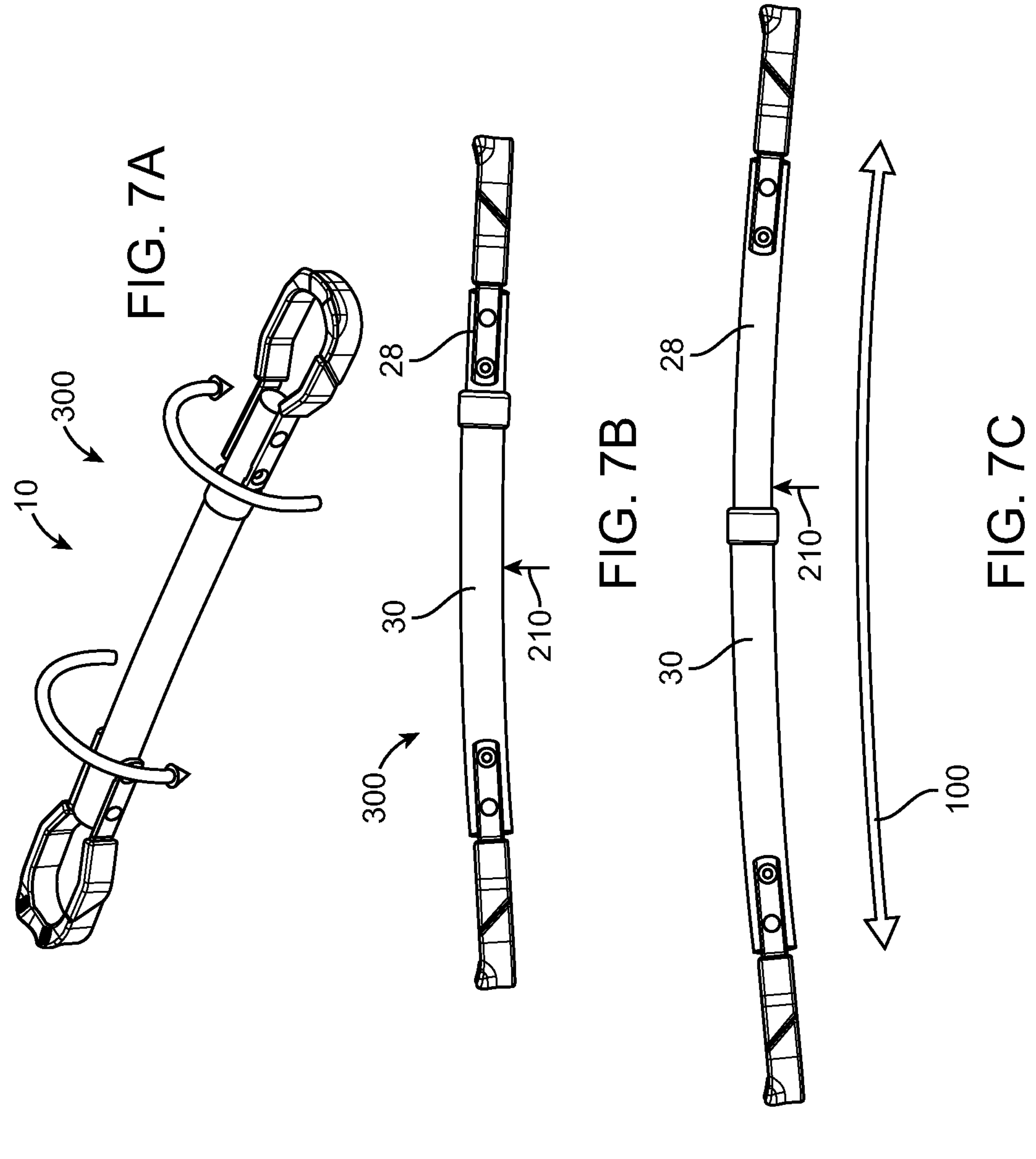
FIGS. 7A, 7B, 7C and 7D are perspective, front retracted, front expanded and schematic views, respectively, of an arced detachable top tube assembly in accordance with an exemplary implementation.
Figure 7D:
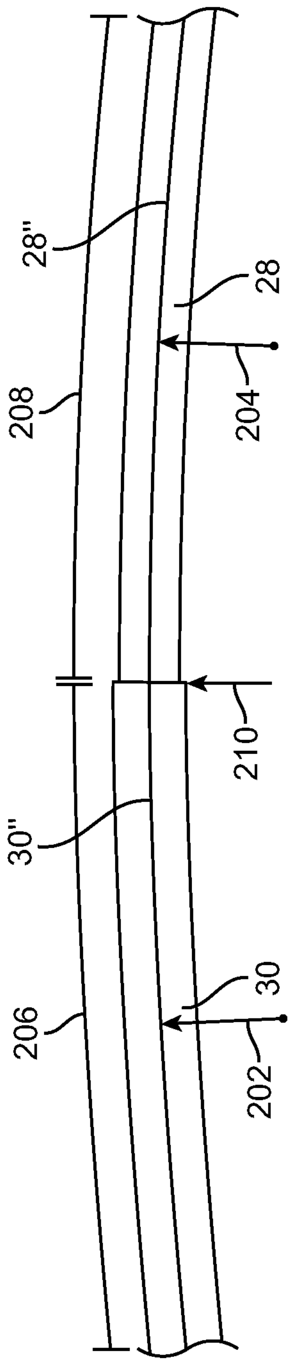

Gate assemblies 40 are provided for opening and closing the yoke assemblies 24, 26. At one end the gate assemblies include downwardly directed angled ends 52. At an opposite end the gate assemblies include button covers 42. The gate assemblies 40 are disposed on sides of the inner and outer tube portions 28', 30' that are opposite the securing portions 46 of the partial loops 38 and are fixed to the inner and outer tube portions 28', 30' so as to allow rotation relative thereto. Accordingly, disposed between the two ends of the gate assemblies 40 are pivot members about which the gate assemblies 40 may rotate. As shown in FIGS. 5C and 5D, the pivot members 54, about which the gate assemblies 40 rotate can comprise one of the plurality of fasteners that are used for securing the partial loops.

While the gate assemblies 40 are rotatably secured to the inner and outer tube portions such that they may be opened (See FIG. 5B) to secure the yoke assemblies 24, 26 about a seat tube or handlebar stem assembly and subsequently closed (See FIG. 5A), biased button assemblies 42 are provided to maintain the gate assemblies 40 in a closed position. As shown in FIGS. 3A, 4, 5B, 5E and 5F, the biased button assemblies 42 are mounted proximate and within the terminal ends of the inner and outer tube portions 28', 30'. Each of the biased button assemblies 42 includes a housing portion 56, a spring, 58 and a bullet member 60. The bullet member 60 projects out of a through-hole 62 on the inner and outer tube members 28, 30 and is received within through-hole 64 of the gate assemblies 40. When the gate assemblies 40 are in a closed position, the bullet member 60 and is received in the through-hole 64, the gate assembly is prevented from pivoting unless the bullet member 60 is pressed inward using thumb-plate 66 of button cover 44.

Referring now to FIGS. 5A-6C, button covers 44 are provided to more easily allow a user to depress bullet member 60 so as to open the gate assemblies 40. Button covers 44 can be secured to the gate assemblies 40 using pivot members 54 and include thumb-plate 66 and an abutment 68, which is disposed on an opposite face of the thumb-plate 66. Upon application of pressure upon thumb-plate plate 66, abutment 68 engages bullet member 60 to depress it from engagement with aperture 64 of the gate assembly 40. Accordingly, gate assembly may then be rotated to open and close the yoke assembly. Without button covers 44, it can be difficult to depress the bullet member 60 from engagement with aperture 64.

Referring now to FIGS. 7A-7D, the detachable top tube assembly 10 can also be configured such that telescoping tube portion 22 is generally arc-shaped; upwardly in an arch in the bicycle-installed configuration depicted in FIGS. 7A-7D. That is, each of the inner tube member 28 and outer tube member 30 are arc-shaped, which due to their non-straight nature, interference develops between the members upon rotation and which limits relative rotation therebetween. According to this implementation that includes arc-shaped inner and outer tube members 28, 30, the cross-sectional shape of the inner and outer tube members can even be circular since sufficient interference is provided by the arc-shaped design to prevent relative rotation between the inner and outer tube members 28 and 30. Additionally, and in accordance with those implementations including an arc, the arc and/or radius of curvature of the tube members 28 and 30 cannot be too sharp as the inner and outer tube member 28, 30 can be prevented from properly telescoping 100 and being received by one another and/or it may be difficult to slide the inner and outer tubes relative to one another. Accordingly, as shown by way of example in FIG. 7D, the arc length 206 of the outer tube member 30 is twelve and one-half inches (about one-third meter), with a corresponding radius of curvature 202 is 113.5 inches (about three meters). Similarly, the arc length 208 of the inner tube member 28 can also advantageously be twelve and one-half inches, with a corresponding radius of curvature 204 being 113.5 inches. As depicted, this radius of curvature 210 measuring 113.5 inches also applies to the overall telescoping tube assembly.

Exemplary implementations have been described hereinabove regarding the implementation of a detachable top tube assembly. Various modifications to and departures from the disclosed implementations will occur to those having skill in the art. The subject matter that is intended to be within the spirit of this disclosure is set forth in the following claims.

The invention claimed is:

1. A detachable surrogate top tube assembly for a bicycle comprising:

an inner tube member having an insert portion that is telescopically inserted within a receiving portion of an outer tube member, the insert and receiving portions each having a lengthwise centered longitudinal axis that is oriented substantially coincident, one with the other, in a retracted configuration;

a first yoke non-rotatably coupled to a first end of the tube assembly;

a second yoke non-rotably coupled to a second end of the tube assembly;

a first gate assembly coupled to the first end of the tube assembly and having a first end, a second end and a pivot portion, wherein the first end and second end pivot about the pivot portion that is located between the first end and the second end;

a second gate assembly coupled to the second end of the tube assembly and having a first end, a second end and a pivot portion, wherein the first end and second end pivot about the pivot portion that is located between the first end and the second end;

the insert portion and the receiving portion each having a length; and the insert portion and the receiving portion each having a non-round cross-sectional shape running along a substantial entirety of their lengthwise centered longitudinal axes for a substantial entirety of their lengths with a sufficiently narrow clearance space therebetween such that rotation of the insert portion relative to the receiving portion is limited by abutting interference between an exterior surface of the inner tube member and an interior surface of the outer tube member;

wherein the insert portion has a substantially uniform cross-sectional shape along a length thereof and the longitudinal axis centered therein is arc-shaped, and the receiving portion has a substantially uniform cross-sectional shape along a length thereof and the longitudinal axis centered therein is arc-shaped.

2. The detachable surrogate top tube assembly as recited in claim 1, wherein the first yoke is non-rotatably coupled to the first end of the tube assembly at a first end of the inner tube member; and the second yoke is non-rotatably coupled to the second end of the tube assembly at a first end of the outer tube member.

3. The detachable surrogate top tube assembly as recited in claim 1, wherein the insert portion and the receiving portion each has an elliptical cross-sectional shape.

4. The detachable surrogate top tube assembly as recited in claim 1, wherein the exterior surface of the insert portion is complementarily shaped to the interior surface of the receiving portion thereby establishing a substantial conformance fit therebetween in the retracted configuration.

5. The detachable surrogate top tube assembly as recited in claim 1, wherein the outer tube member surrounds a majority of a length of the inner tube member in the retracted configuration.

6. The detachable surrogate top tube assembly as recited in claim 1, wherein each of the longitudinal axes is arc-shaped on an approximately three meter radius.

7. The detachable surrogate top tube assembly as recited in claim 6, wherein the inner tube member and the outer tube member are each approximately one-third of a meter long.

8. The detachable surrogate top tube assembly as recited in claim 1, further comprising a releasable bicycle frame securement device coupled, one each, to the inner tube member and the outer tube member.

9. The detachable surrogate top tube assembly as recited in claim 1, further comprising a bullet member configured to hold the first gate assembly in a closed configuration and a thumb-plate installed on the exterior of the first gate assembly and configured to abut the bullet member upon depression.

10. The detachable surrogate top tube assembly as recited in claim 9, further comprising another bullet member configured to hold the second gate assembly in a closed configuration and a thumb-plate installed on the exterior of the second gate assembly and configured to abut the another bullet member upon depression.

11. A detachable surrogate top tube assembly for a bicycle comprising:

an inner tube member having an insert portion that is telescopically inserted within a receiving portion of an outer tube member, the insert and receiving portions each having a lengthwise centered longitudinal axis that is oriented substantially coincident, one with the other, in a retracted configuration;

each of the insert portion and the receiving portion has a non-round substantially uniform cross-sectional shape along a length thereof and the longitudinal axis centered therein is arc-shaped; and a first yoke and a second yoke, the first yoke and the second yoke non-rotatably attached to the surrogate top tube assembly;

a first gate assembly coupled to a first end of the surrogate top tube assembly and having a first end, a second end and a pivot portion, wherein the first end and second end pivot about the pivot portion that is located between the first end and the second end;

a second gate assembly coupled to a second end of the surrogate top tube assembly and having a first end, a second end and a pivot portion, wherein the first end and second end pivot about the pivot portion that is located between the first end and the second end.

12. The detachable surrogate top tube assembly as recited in claim 11, wherein the first yoke is attached to the surrogate tube top assembly at the first end of the inner tube member distal the insert portion.

13. The detachable surrogate top tube assembly as recited in claim 11, wherein both the insert portion and the receiving portion each has a substantially uniform cross-sectional shape along a respective length thereof and the longitudinal axes centered therein are arc-shaped.

14. The detachable surrogate top tube assembly as recited in claim 11, further comprising:

the insert portion and the receiving portion each has a longitudinal axis centered therein that is arc-shaped; and a clearance space is located between the insert portion and the receiving portion that is sufficiently narrow that rotation of the insert portion relative to the receiving portion is limited by abutting interference between an exterior surface of the inner tube member and an interior surface of the outer tube member upon relative rotation of the members.

15. The detachable surrogate top tube assembly as recited in claim 11, wherein the insert portion and the receiving portion each has an elliptical cross-sectional shape.

16. The detachable surrogate top tube assembly as recited in claim 11, wherein the exterior surface of the insert portion is complementarily shaped to the interior surface of the receiving portion thereby establishing a substantial conformance fit therebetween in the retracted configuration.

17. The detachable surrogate top tube assembly as recited in claim 11, wherein the outer tube member surrounds a majority of a length of the inner tube member in the retracted configuration.

18. The detachable surrogate top tube assembly as recited in claim 13, wherein each of the longitudinal axes is arc-shaped on an approximately three meter radius.

19. The detachable surrogate top tube assembly as recited in claim 18, wherein the inner tube member and the outer tube member are each approximately one-third of a meter long.

20. The detachable surrogate top tube assembly as recited in claim 11, further comprising a releasable bicycle frame securement device coupled, one each, to the inner tube member and the outer tube member.

* * * * *